Figure 1:
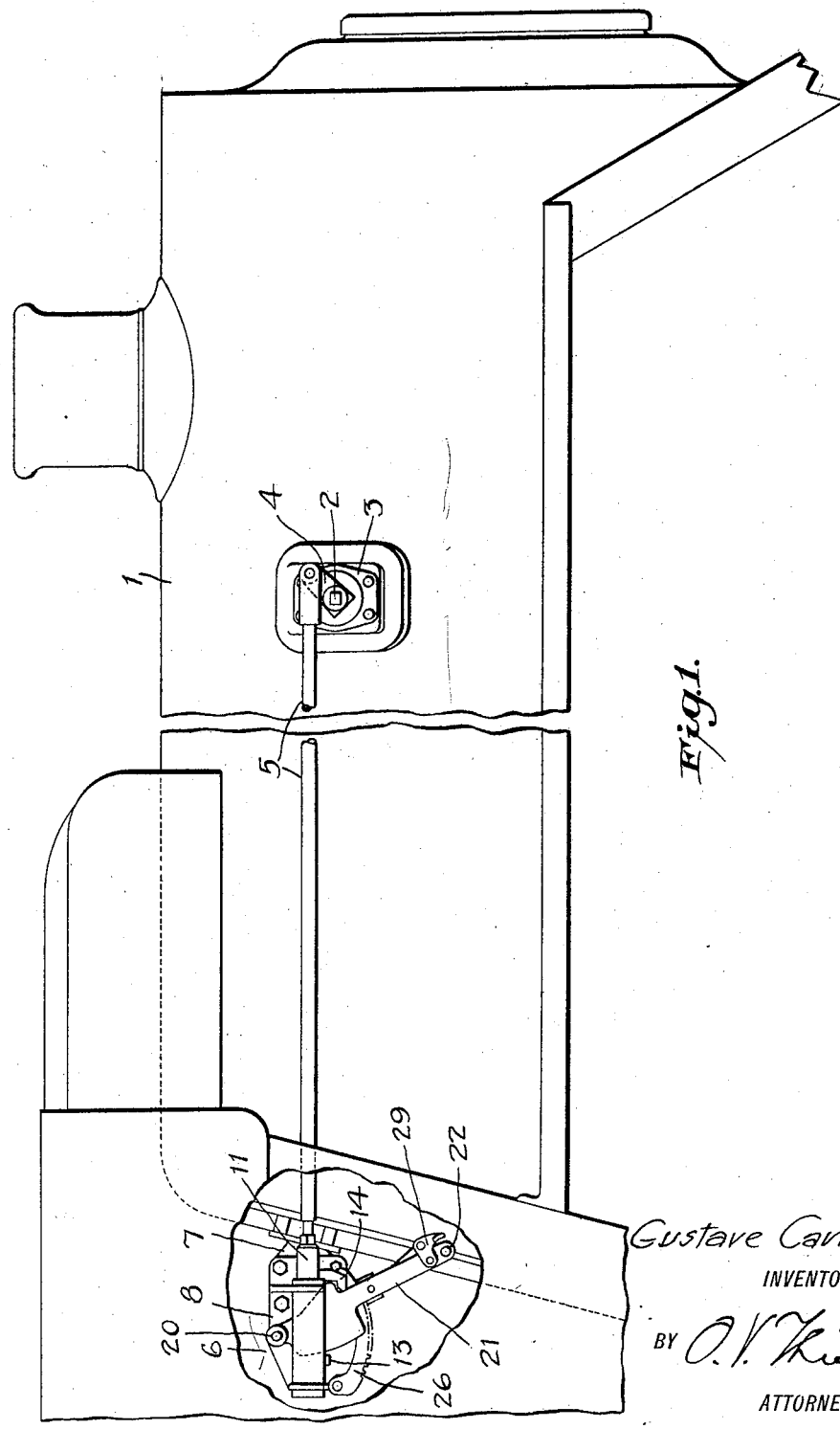

March 3, 1931.  G. CAVIN  1,794,834
VALVE OPERATING MECHANISM
Filed Jan. 18, 1928  5 Sheets-Sheet 1

Gustave Cavin
INVENTOR
BY O. V. Thiele
ATTORNEY

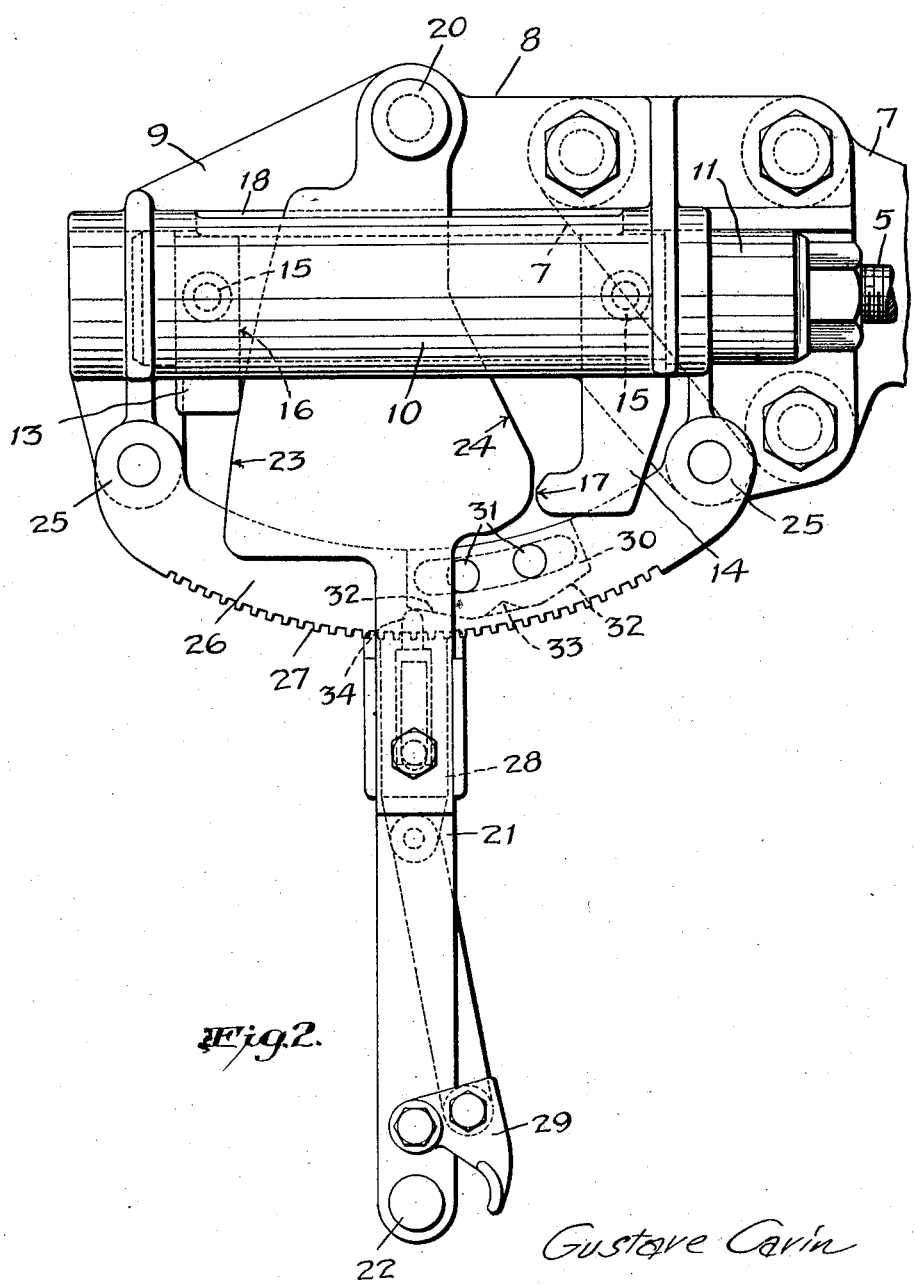

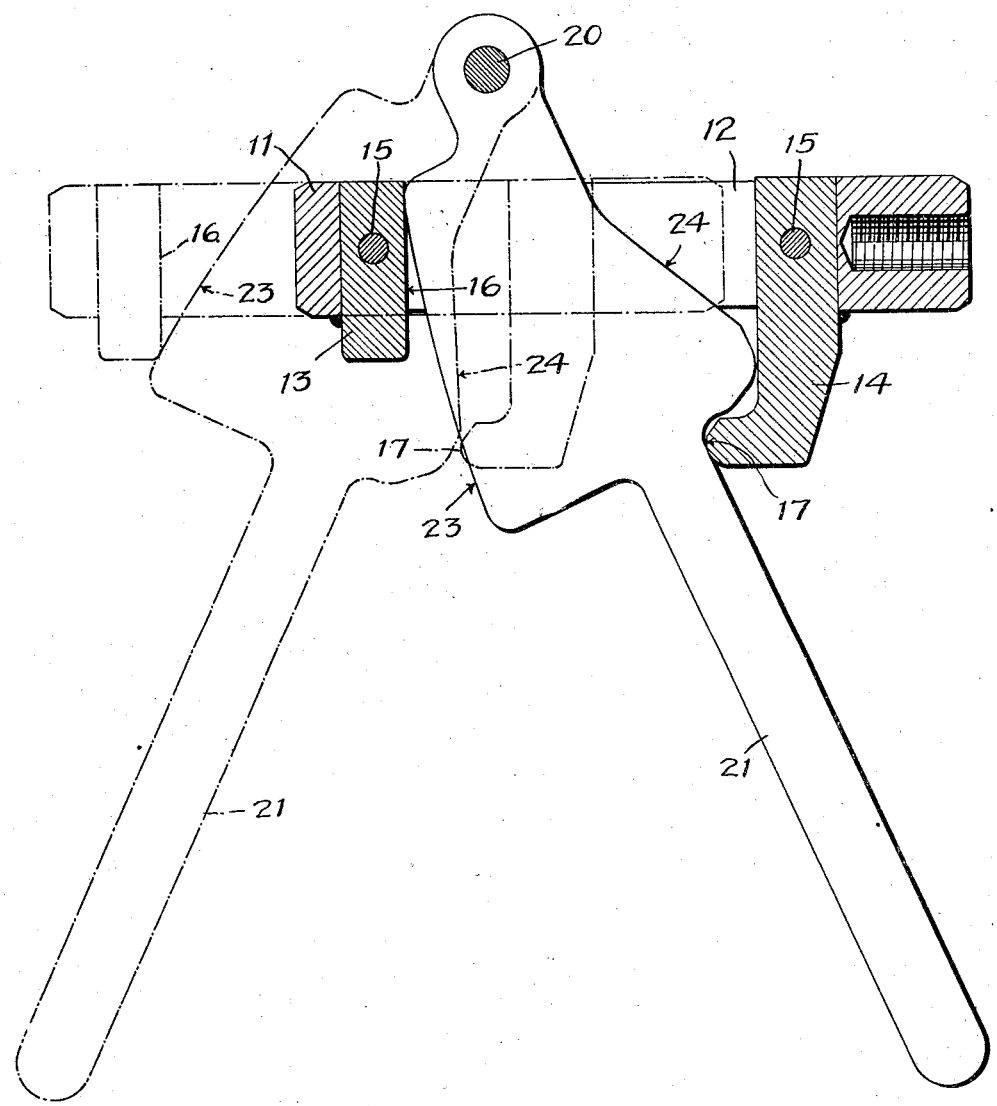

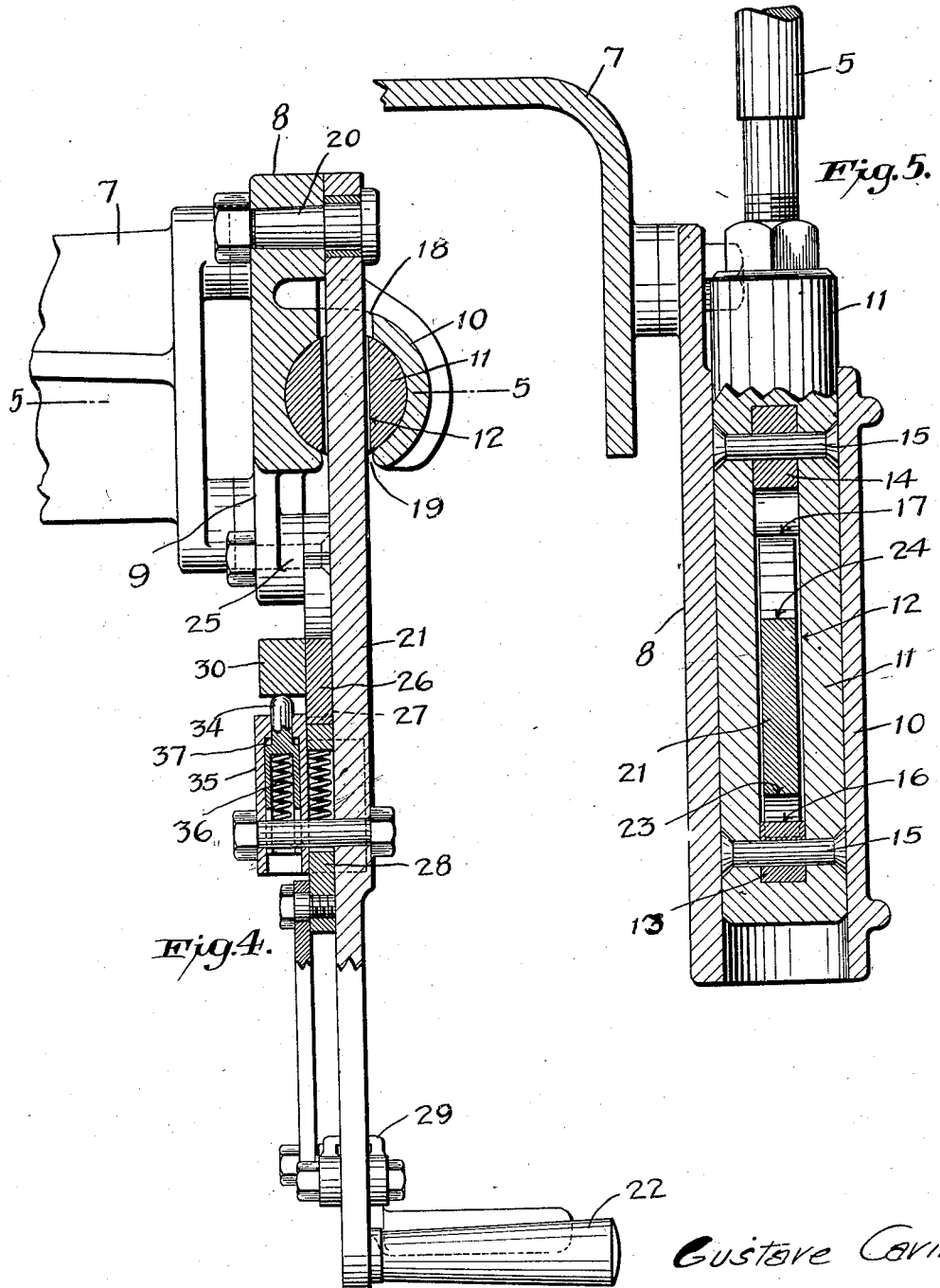

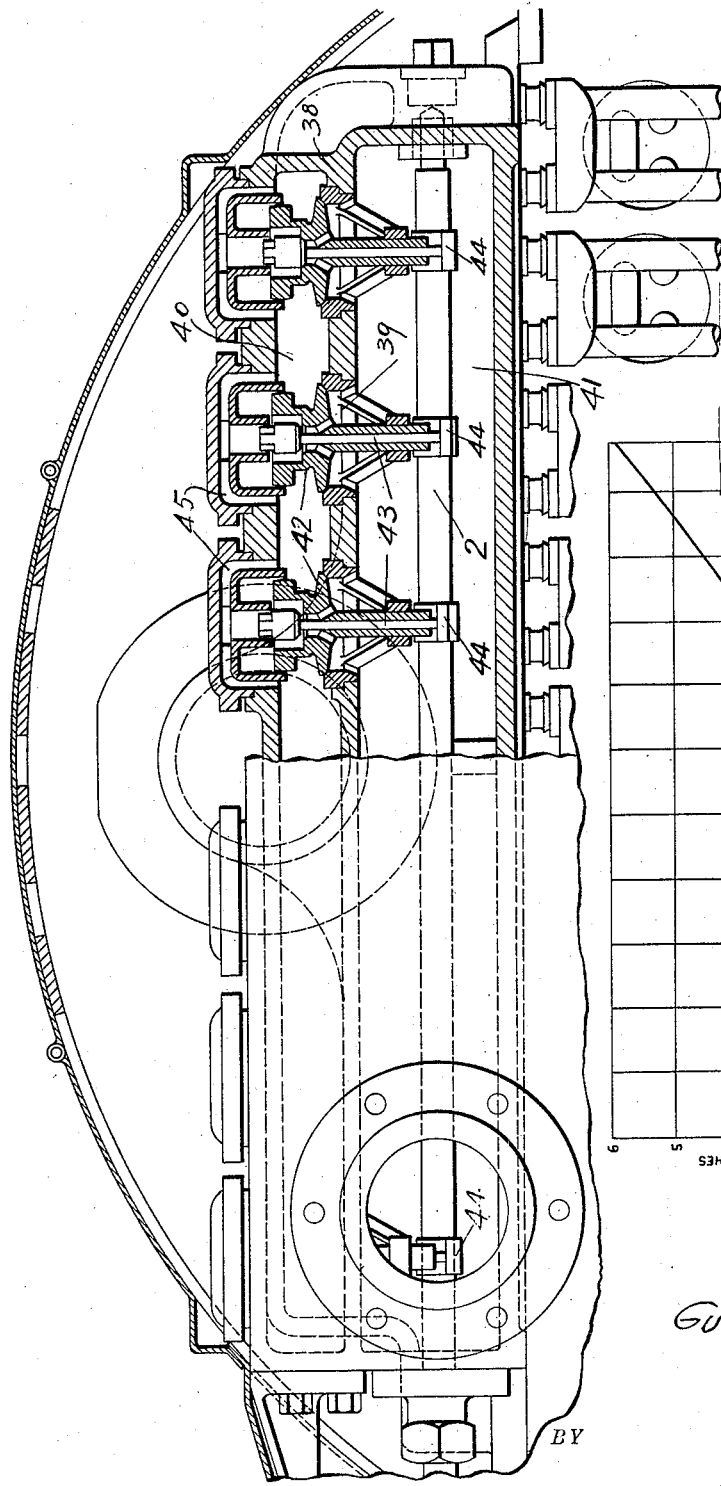
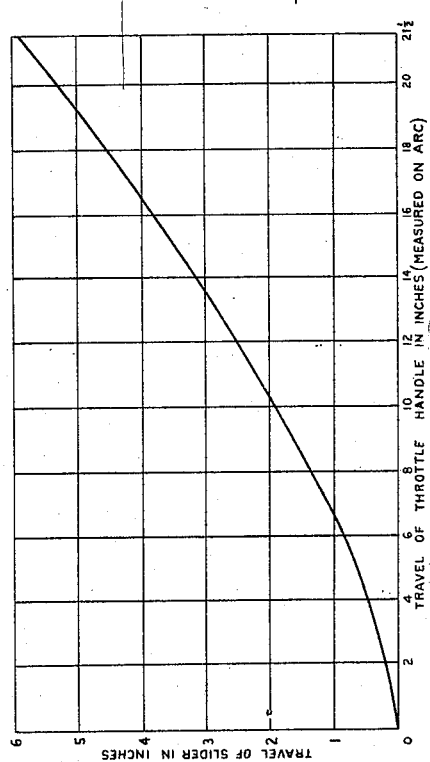

Patented Mar. 3, 1931

1,794,834

UNITED STATES PATENT OFFICE

GUSTAVE CAVIN, OF KINGSTON, ONTARIO, CANADA, ASSIGNOR TO AMERICAN THROTTLE COMPANY, INC., OF NEW YORK, N. Y.

VALVE-OPERATING MECHANISM

Application filed January 18, 1928. Serial No. 247,691.

My invention relates to valve-operating mechanisms and has particular reference to devices of the type particularly adapted for use with locomotive throttle valves. More specifically the invention relates to throttle-operating mechanism for use in conjunction with throttles of the multiple valve type. In the control of locomotive throttle valves, it is particularly desirable to provide very accurate control of the valve when the latter is in a slightly opened position in order to provide the most accurate control over the locomotive for "spotting" and other manœuvring purposes. Where single throttle valves are used, the forces ordinarily required to operate the throttle are of considerable magnitude, and accurate regulation of the position of the throttle valve is a serious problem. In throttles of the multiple valve type, the same problem is present and is particularly acute where unbalanced forces are encountered in the initial opening stages of the valve, due to the use of unbalanced pilot valves which are opened ahead of the main valves.

In order to secure the necessary accuracy of control over the throttle, a relatively high leverage ratio must be employed, but the maximum ratio permissible is limited by the allowable amount of travel of the throttle lever in the locomotive cab.

In order to secure the necessary leverage ratio and at the same time limit the total travel of the throttle lever, throttle-operating mechanisms have heretofore been developed which provide a variable leverage as the throttle is moved from closed to open position. There is, however, a wide difference between the operating characteristics of different types of throttle, and the present invention is in the nature of an improvement upon the known forms of variable leverage mechanisms; the construction of the improved form being such that the operating characteristics of the mechanism may be readily adapted to suit the characteristics of the individual throttle which it is to operate.

The invention further consists in the novel combinations and arrangements of parts which will be clearly evident from the ensuing description of a preferred form of the invention as applied to a multiple valve throttle.

In the accompanying drawings forming a part hereof, Fig. 1 is a fragmentary elevation of a locomotive with a portion of the figure broken away to show the operating mechanism; Fig. 2 is an elevation on a larger scale of the mechanism embodying the invention; Fig. 3 is a diagrammatic section taken through the longitudinal center line of the mechanism shown in Fig. 2 and showing respectively in full and dotted lines the position of the operating lever in closed and open position; Fig. 4 is a section taken transversely through the operating mechanism, Fig. 5 is a section taken on the line 5—5 of Fig. 4; Fig. 6 is a transverse elevation partly in section of the locomotive throttle, and Fig. 7 is a diagram illustrating the variation in the travel of the throttle opening mechanism illustrated in the preceding figures.

Referring now to Fig. 1, the locomotive is shown equipped with a so-called "outside" throttle located in the smoke-box 1 and operated from the exterior of the smoke-box by means of a cam shaft 2 extending through a suitable stuffing box 3. The shaft 2 is provided on its outer end with an operating crank 4 to which is pivoted the throttle rod 5 extending along the locomotive to the cab, where it is attached to the operating mechanism indicated generally at 6.

The throttle is opened and closed by longitudinal movement of the rod 5 and this motion is manually controlled through the medium of the operating mechanism shown in detail in Figures 2 to 5.

Referring now to these figures, the operating mechanism comprises a bracket 7 adapted to be secured to the rear head of the locomotive and to which is secured the casting 8, the latter comprising a flat plate portion 9 and a hollow cylindrical portion 10 having a bore in alinement with the rod 5. The rod 5 is secured to a cylindrical sliding member 11 having a working fit within the cylinder 10 and provided intermediate its ends with a vertical slot 12. The forward and rear ends of slot 12 are preferably defined by separable bearing members 13 and 14 suitably secured to the member 11, as by rivets 15. The member 13, as will be seen from Fig. 3, is formed with a plane vertical forward face 16 extending a short distance below the bottom of member 11, and the forward member 14 is carried a greater distance below member 11 and terminates in a rounded rearwardly projecting bearing face 17.

The cylinder 10 is provided with a slot 18 above slot 12 and a corresponding slot 19 below slot 12. The flat face portion 9 of the casting 8 is drilled above the slot 18 about midway of its length to accommodate a pivot 20, the latter supporting a throttle lever 21 which extends downwardly through the alined slots 18, 12 and 19 and terminates at its lower end in an operating handle 22.

The portion of the throttle lever 21 passing through the slots in the cylinder 10 and member 11 is enlarged to form a rearwardly projecting cam surface 23 and a forwardly projecting surface 24, the former of said surfaces being struck on a long radius, the chord of the arc lying at a slight angle to the longitudinal axis of the lever. The upper portion of the forward cam face 24 extends downwardly and diagonally away from the longitudinal axis of the lever along a substantially straight line, while the lower portion of the cam is substantially arcuate in form, extending back toward the longitudinal axis of the lever.

Referring now to the full line position shown in Fig. 3, it will be seen that the cam surfaces 23 and 24 of the throttle lever are so proportioned that when in the closed position the rear cam face 23 contacts with the member 13 at the upper end of the face 16 while the forward cam face 24 makes contacts with the rearwardly projecting face 17 of the member 14. From this arrangement it will be evident that when the lever 21 is in this position the member 11 is held against longitudinal movement with respect to the lever by the oppositely contacting cam faces. It will further be evident that a rearward pull on the throttle lever will, through the sliding action of the cam face 23 bearing on face 16, cause the member 11 to be pulled in a rearward direction through the cylinder 10, thereby imparting motion to the rod 5 and through the lever 4 and shaft 2 actuating the throttle valve to open it.

As the lever 21 is moved progressively to open position, the point of contact between the cam face 23 and the face 16 moves progressively downward until it reaches the lower edge of the face 16 as is shown in the dotted line position in Fig. 3. Obviously this movement of the point of contact between these members provides a gradually decreasing leverage applied to the member 11, so that when the latter is in its forward or closed position the maximum leverage may be applied thereon, and as it is moved to its rearward or open position the leverage is progressively decreased and the relative amount of movement of member 11 for a given movement of lever 21 progressively increased.

The casting 8 is provided with lugs 25 to which is bolted the ratchet plate 26 carrying a set of downwardly projecting teeth 27. The throttle lever 21 has secured thereto the pawl 28 operated through the medium of the manually-controlled pivoted latch 29, the pawl engaging the teeth 27 to secure the throttle lever in any desired selective position.

In order to provide a readily releasable latch for holding the throttle in a proper partially opened or "drifting" position, the slotted lug 30 is secured to the side of member 26 by means of studs 31. The lower face of the lug 30 is formed with beveled ends 32 and a centrally located notch 33. Mounted on the throttle lever is the plunger 34 movable vertically in a suitable block 35 and urged to an upper position by spring 36. The maximum upward travel of plunger 34 is limited by the shoulder 37 formed in the mounting block 36, and this position is such that when moved past the lug 30 the plunger 34 will engage the beveled faces 32 of the lug. As the lever is pushed past the lug 30 in either direction, the plunger 34 is depressed until it strikes the notch 33, forming a stop which, however, may be readily released by direct force applied to the lever handle 22. The notch 33 is used only to indicate the proper drifting position of the lever 21 and is not relied upon to hold the lever in this position, as the lever is secured in any given position by means of the pawl 28.

As the characteristics of individual locomotives vary, even though they may be of the same design, and the lug 30 is made adjustable, so that by loosening the studs 31 lug 30 may be moved longitudinally to a position such that the stop recess 33 will indicate the proper "drifting" position for that particular locomotive and the lug 30 may be then permanently secured in place by tightening the studs.

Referring now to Fig. 6, a known form of multiple throttle valve is shown comprising a bi-chambered casing 38 provided with a plurality of alined ports 39 affording communication between the inlet chamber 40 and outlet chamber 41. Each port is controlled by means of a main valve 42 and each of these valves is in turn provided with a small pilot valve 43, the latter valves acting to balance the main valves before the latter are opened. Both the main valves and the pilot valves are actuated by the cam-shaft 2, the latter being provided with suitable cams 44. In the particular form of throttle shown, the several pilot valves are progressively opened before the first main valve is lifted from its seat, and it is to be noted that this mode of operation necessitates the lifting of these pilot valves against the pressure of the steam in the inlet chamber 40, the latter being placed in communication with the upper faces of the pilot valves through the passages 45.

In order to provide an easily operated mechanism it will be obvious that a large leverage ratio must be employed until the unbalanced pilot valves have all been opened and there remains to be opened only the main valves which have been balanced by the opening of the pilot valves.

In the form of mechanism illustrated, this characteristic is provided as will be apparent from Fig. 7. Referring now to this figure, it will be seen that the first six inches of travel of the throttle handle results in a movement of the throttle rod 5 by less than one inch so that the leverage ratio through this range of movement of the mechanism is greater than 6 to 1. The cam arrangement in the throttle valve is such that during this initial opening range where the high leverage ratio is available, the pilot valves are all opened. Upon continued opening movement of the throttle, the leverage ratio decreases as will be seen by reference to the relative travels of the throttle handle and the throttle rod when the former is moved from, for example, 10 to 14 inches from the closed position. During this four inch travel of the throttle handle, the throttle rod moves considerably more than one inch so that the leverage ratio is reduced to less than 4 to 1.

It will be readily apparent that the leverage ratio secured may be widely varied by suitable variation in the contour of the cam face 23 of the throttle lever and its relative position with respect to the pivot 20. The form of this cam face will determine the relative travel of the throttle lever and the throttle rod, and once the proper contour for the desired leverage ratios is determined, the contour of the cam face 24 may be readily determined, this cam face being arranged so that throughout the operating range of the throttle lever the bearing face 17 on member 14 makes contact with the forward cam face. The determination of the proper contour of cam face 24 is necessary only to eliminate lost motion, as the relative motion of the throttle rod 5 with respect to the throttle lever 21 is the same in either opening or closing movement.

The invention is obviously subject to various changes and modifications in the specific form of apparatus by which it may be carried into effect, and the embodiment herein shown is therefore to be taken as illustrative only and not limiting in sense.

I claim:

1. In apparatus of the class described, the combination with a lever having a fixed pivot and provided with a cam face, of a longitudinally sliding member having a portion adapted to be engaged by said cam face to move said member, said member being mounted with respect to said lever so that the distance between the pivot point of the lever and the point of contact between the lever and the sliding member varies as the lever is moved about its pivot, a valve, and means connecting the sliding member with the valve to actuate the latter.

2. In apparatus of the class described, the combination with a lever having a fixed pivot and provided with a convex cam face, of a longitudinally sliding member having a relatively fixed face adapted to be engaged by said cam face to move said member, a valve and means connecting said valve with said member, said member being mounted with respect to said lever so that the distance between the pivot point of the lever and the point of contact between the lever and the sliding member increases as the lever is moved about its pivot to open the valve.

3. A throttle actuating mechanism comprising a mounting bracket, a longitudinally sliding member carried by said bracket, a lever having a fixed pivot on said bracket and adapted to actuate said member, said lever and said bracket being provided with cooperating cam faces, the location and contours of said faces being such that the leverage ratio between said lever and said member varies as the lever is moved about its pivot.

4. A throttle actuating mechanism comprising a mounting bracket, a slotted longitudinally sliding member carried by said bracket, a lever having a fixed pivot on said bracket and extending transversely through the slot in said member, the opposite sides of said lever being provided with curved cam faces of different contour engaging cooperating faces on said member in line contact to move the latter as the lever is moved about its pivot.

5. A throttle actuating mechanism comprising a mounting bracket, a slotted longitudinally sliding member carried by said bracket, a lever having a fixed pivot on said bracket and passing through said slot, said lever being provided with curved cam surfaces on opposite sides thereof, one of said surfaces engaging a cooperating surface at one end of the slot to move said member as said lever is moved in one direction about its pivot, the other of said surfaces engaging a cooperating surface at the other end of said slot to move said member in the opposite direction as the lever is moved about its pivot in the opposite direction, and the contour of said cam surfaces being such that there is substantially no lost motion between the lever and the sliding member in any operative position of the lever.

6. A throttle actuating mechanism comprising a mounting bracket, a valve actuating member sliding longitudinally therein and provided with an operating face, and an actuating lever having a relatively fixed pivot at one end and a lateral cam face arranged to engage said first named face in rolling contact as the lever is moved about its pivot, whereby the distance between the point of contact between said faces and the fixed pivot varies as the lever is moved about its pivot.

7. In apparatus of the class described, the combination of a longitudinally sliding valve operating member having spaced opposed transverse bearing surfaces, a lever having a fixed pivot at one end and passing between said surfaces, said lever being provided with curved cam faces each engaging one of said surfaces in line contact, said lever being so arranged with respect to said member that the distance between the pivot and the lines of contact between the lever and the sliding member varies as the lever is moved about its pivot.

8. In apparatus of the class described, the combination of a slotted longitudinally sliding valve operating member having a plane bearing surface at one end of the slot, a lever having a fixed pivot at one end and passing through said slot, said lever being provided with a convex cam face engaging said plane surface in line contact, and said lever and said member being arranged so that the position of the line of contact between the cam face and the bearing surface changes as the lever is moved about its pivot.

9. In apparatus of the class described, the combination of a slotted longitudinally sliding valve operating member having a plane bearing surface at one end of the slot and an opposed convex bearing surface at the other end of the slot, said last named surface being substantially offset with respect to the axis of said member, a lever having a fixed pivot and passing through said slot, said lever having opposed convex cam faces engaging said surfaces in line contact to move said member as the lever is moved about its pivot.

GUSTAVE CAVIN.